United States Patent
Erickson et al.

(10) Patent No.: US 11,481,233 B2
(45) Date of Patent: Oct. 25, 2022

(54) AUGMENTING LEGACY USER INTERFACES USING WORKFLOWS

(71) Applicant: LogistiVIEW, INC., Cary, NC (US)

(72) Inventors: David Brian Koch Erickson, Chanhassen, MN (US); Seth Robert Patin, Raleigh, NC (US); Amin Fetanat Fard Haghighi, Holly Springs, NC (US); Raymond Pasquale Spagnola, Apex, NC (US)

(73) Assignee: LogistiVIEW, Inc., Cary, NC (US)

( * ) Notice: Subject to any disclaimer, the term of this patent is extended or adjusted under 35 U.S.C. 154(b) by 0 days.

(21) Appl. No.: 16/570,818

(22) Filed: Sep. 13, 2019

(65) Prior Publication Data
US 2021/0081221 A1    Mar. 18, 2021

(51) Int. Cl.
*G06F 9/451* (2018.01)
(52) U.S. Cl.
CPC ................. *G06F 9/451* (2018.02)
(58) Field of Classification Search
CPC ........ G06F 9/451; G06F 8/31; G06F 9/30174; G06F 16/25; G06F 16/972; G06F 2209/545; G06F 9/5033; G06F 9/543; G06Q 10/0633; Y02D 10/00
See application file for complete search history.

(56) References Cited

U.S. PATENT DOCUMENTS

| | | | |
|---|---|---|---|
| 6,199,068 B1 * | 3/2001 | Carpenter | G01D 4/004 |
| 6,233,543 B1 * | 5/2001 | Butts | G06F 9/54 |
| | | | 703/27 |
| 6,742,015 B1 * | 5/2004 | Bowman-Amuah | G06F 8/20 |
| | | | 709/223 |
| 7,461,385 B2 * | 12/2008 | Winter | G06F 8/20 |
| | | | 703/27 |
| 7,784,022 B2 | 8/2010 | Elfner et al. | |
| 8,332,809 B2 | 12/2012 | Mauceri, Jr. et al. | |
| 9,256,472 B2 | 2/2016 | Kakade et al. | |
| 9,298,429 B2 | 3/2016 | Bohle | |

(Continued)

OTHER PUBLICATIONS

International Search Report for application No. PCT/US2020/050125 dated Dec. 17, 2020.

*Primary Examiner* — Kieu D Vu
*Assistant Examiner* — Rami R Okasha
(74) *Attorney, Agent, or Firm* — Artegis Law Group, LLP

(57) ABSTRACT

Execution systems for augmenting legacy user interfaces include a memory, one or more input/output device, and one or more processors coupled to the memory and the one or more input/output devices. The one or more processors are configured to load a workflow described according to a workflow structure, the workflow structure describing subprocesses of the workflow, routings between the subprocesses, and actions that make up the subprocesses; connect to a legacy user interface based on the workflow; receive a message from the legacy user interface; determine a subprocess for responding to the message based on the workflow; and perform one or more actions of the determined subprocess to respond to the message. In some embodiments, performing the one or more actions includes presenting information from the message to an operator, soliciting input from the operator, and sending a response to the legacy user interface based on the input.

20 Claims, 5 Drawing Sheets

(56) References Cited

U.S. PATENT DOCUMENTS

| | | | |
|---|---|---|---|
| 9,471,405 B1* | 10/2016 | Mor | G06F 8/38 |
| 9,672,487 B1 | 6/2017 | Garcia et al. | |
| 9,690,577 B1* | 6/2017 | Crew | G06F 11/3672 |
| 10,033,797 B1* | 7/2018 | Alger | H04L 69/08 |
| 10,055,214 B2 | 8/2018 | Lategan | |
| 10,158,701 B2 | 12/2018 | Lemire et al. | |
| 10,372,515 B1* | 8/2019 | Stripe | G06F 9/546 |
| 2003/0074342 A1* | 4/2003 | Curtis | G06Q 10/10 |
| 2003/0115025 A1* | 6/2003 | Lee | G06Q 10/10 |
| | | | 703/1 |
| 2003/0193521 A1* | 10/2003 | Chen | G06F 9/451 |
| | | | 715/762 |
| 2003/0225469 A1 | 12/2003 | Deremer et al. | |
| 2004/0054812 A1 | 3/2004 | Liang et al. | |
| 2004/0078105 A1* | 4/2004 | Moon | G06Q 10/10 |
| | | | 700/100 |
| 2004/0226027 A1* | 11/2004 | Winter | G06F 8/20 |
| | | | 719/328 |
| 2005/0114187 A1* | 5/2005 | Adachi | G06Q 10/0633 |
| | | | 719/313 |
| 2006/0271849 A1* | 11/2006 | Thormaehlen | G06F 8/10 |
| | | | 715/202 |
| 2007/0011334 A1* | 1/2007 | Higgins | G06F 11/3604 |
| | | | 709/227 |
| 2007/0094372 A1* | 4/2007 | Hariharan | H04L 67/2823 |
| | | | 709/223 |
| 2007/0130162 A1* | 6/2007 | van Wyk | G06Q 10/06 |
| 2007/0250304 A1* | 10/2007 | Elfner | G06F 9/451 |
| | | | 703/27 |
| 2008/0189646 A1* | 8/2008 | Bohle | G06F 8/70 |
| | | | 715/781 |
| 2010/0064357 A1* | 3/2010 | Baird | G06F 8/30 |
| | | | 726/6 |
| 2010/0250867 A1* | 9/2010 | Bettger | G06F 16/176 |
| | | | 711/152 |
| 2010/0293506 A1* | 11/2010 | Rich | G06F 3/0481 |
| | | | 715/810 |
| 2011/0113377 A1* | 5/2011 | Lategan | H04L 47/70 |
| | | | 715/835 |
| 2011/0170561 A1* | 7/2011 | Yaffe | H04L 45/00 |
| | | | 370/474 |
| 2011/0239126 A1* | 9/2011 | Erickson, Jr. | H04L 41/22 |
| | | | 715/744 |
| 2011/0289027 A1* | 11/2011 | Moore | G06F 11/302 |
| | | | 706/12 |
| 2011/0320944 A1* | 12/2011 | Nikara | G06F 9/451 |
| | | | 715/716 |
| 2012/0185829 A1* | 7/2012 | Yaffe | G06F 11/362 |
| | | | 717/125 |
| 2013/0117728 A1* | 5/2013 | Fernandez | G06F 8/30 |
| | | | 717/106 |
| 2015/0193123 A1* | 7/2015 | Inukonda | G06F 3/048 |
| | | | 715/780 |
| 2015/0193512 A1 | 7/2015 | No et al. | |
| 2016/0171417 A1* | 6/2016 | Sankaralingham | G06F 3/04886 |
| | | | 705/7.42 |
| 2016/0217058 A1* | 7/2016 | Kidron | G06F 9/543 |
| 2016/0321589 A1* | 11/2016 | Powers | G06F 16/26 |
| 2016/0328132 A1 | 11/2016 | Davidchuk et al. | |
| 2016/0380915 A1* | 12/2016 | Umapathy | G06F 9/451 |
| | | | 709/226 |
| 2017/0090953 A1* | 3/2017 | Lategan | G06F 3/04842 |
| 2017/0289292 A1* | 10/2017 | Arning | H04L 67/42 |
| 2018/0032490 A1* | 2/2018 | Hill | G06F 40/151 |
| 2019/0266525 A1 | 8/2019 | Patin et al. | |
| 2019/0278639 A1* | 9/2019 | Colmone | G06F 9/4484 |
| 2020/0065152 A1* | 2/2020 | Parmar | G06F 16/288 |
| 2020/0150954 A1* | 5/2020 | Nelluri | G06F 8/76 |
| 2020/0301674 A1* | 9/2020 | Swope | G06F 9/542 |
| 2020/0301902 A1* | 9/2020 | Maloy | G06F 40/174 |
| 2020/0348913 A1* | 11/2020 | Cerar | G06F 8/70 |
| 2020/0389543 A1* | 12/2020 | Swope | G06F 8/36 |

* cited by examiner

AUGMENTING LEGACY USER INTERFACES USING WORKFLOWS

TECHNICAL FIELD

The present disclosure relates generally to computing systems, and more particularly to execution systems that are usable to augment legacy user interfaces.

BACKGROUND

Legacy computing systems often have very limited user interfaces that reflect the user interface capabilities and paradigms from when they were designed and programmed. These legacy user interfaces are typically brittle and are not easily adapted for modern computing systems, such as those supporting newer interface devices, augmented reality front ends, wearable technology, and/or the like. For example, a legacy computing system for an enterprise application may include a large number of data entry screens that were originally intended to be accessed using a hardwired computer terminal (e.g., using a keyboard and a 12 or 24 line by 80 character monochrome screen). And even though these data entry screens and other legacy user interfaces may still have utility (e.g., by accessing them through a terminal emulation program running on a client device), updating these user interfaces for modern input devices and paradigms or to handle new uses and workflows often takes significant programming and updating of the software in the back end of the legacy computing system and/or the development of software for custom end-user facing front ends. As these are typically quite costly and in constant need of updating as new interface devices and approaches are developed, these are often not attractive or practical options for addressing the limitations of the legacy computing systems and their legacy user interfaces.

Accordingly, it would be advantageous to have improved systems and methods for augmenting legacy user interfaces to handle modern computing and interface paradigms without having to modify the software of the legacy user interface or to need to develop software for custom end-user facing front ends.

SUMMARY

Consistent with some embodiments, a computing system includes a memory, one or more input/output device, and one or more processors coupled to the memory and the one or more input/output devices. The one or more processors are configured to load a workflow described according to a workflow structure, the workflow structure describing subprocesses of the workflow, routings between the subprocesses, and actions that make up the subprocesses; connect to a legacy user interface based on the workflow; receive a message from the legacy user interface; determine a subprocess for responding to the message based on the workflow; and perform one or more actions of the determined subprocess to respond to the message.

Consistent with some embodiments, a method includes loading, by one or more processors of an execution system, a workflow described according to a workflow structure, the workflow structure describing subprocesses of the workflow, routings between the subprocesses, and actions that make up the subprocesses; connecting, by the one or more processors, the execution system to a legacy user interface based on the workflow; receiving, by the one or more processors, a message from the legacy user interface; determining, by the one or more processors, a subprocess for responding to the message based on the workflow; and performing, by the one or more processors using the execution system, one or more actions of the determined subprocess to respond to the message.

Consistent with some embodiments, a non-transitory machine-readable medium comprising a plurality of machine-readable instructions which when executed by one or more processors associated with a computing device cause the processors to perform a method. The method includes loading a workflow described according to a workflow structure, the workflow structure describing subprocesses of the workflow, routings between the subprocesses, and actions that make up the subprocesses; connecting the computing device to a legacy user interface based on the workflow; receiving a message from the legacy user interface; determining a subprocess for responding to the message based on the workflow; and performing one or more actions of the determined subprocess to respond to the message.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Figure 1:
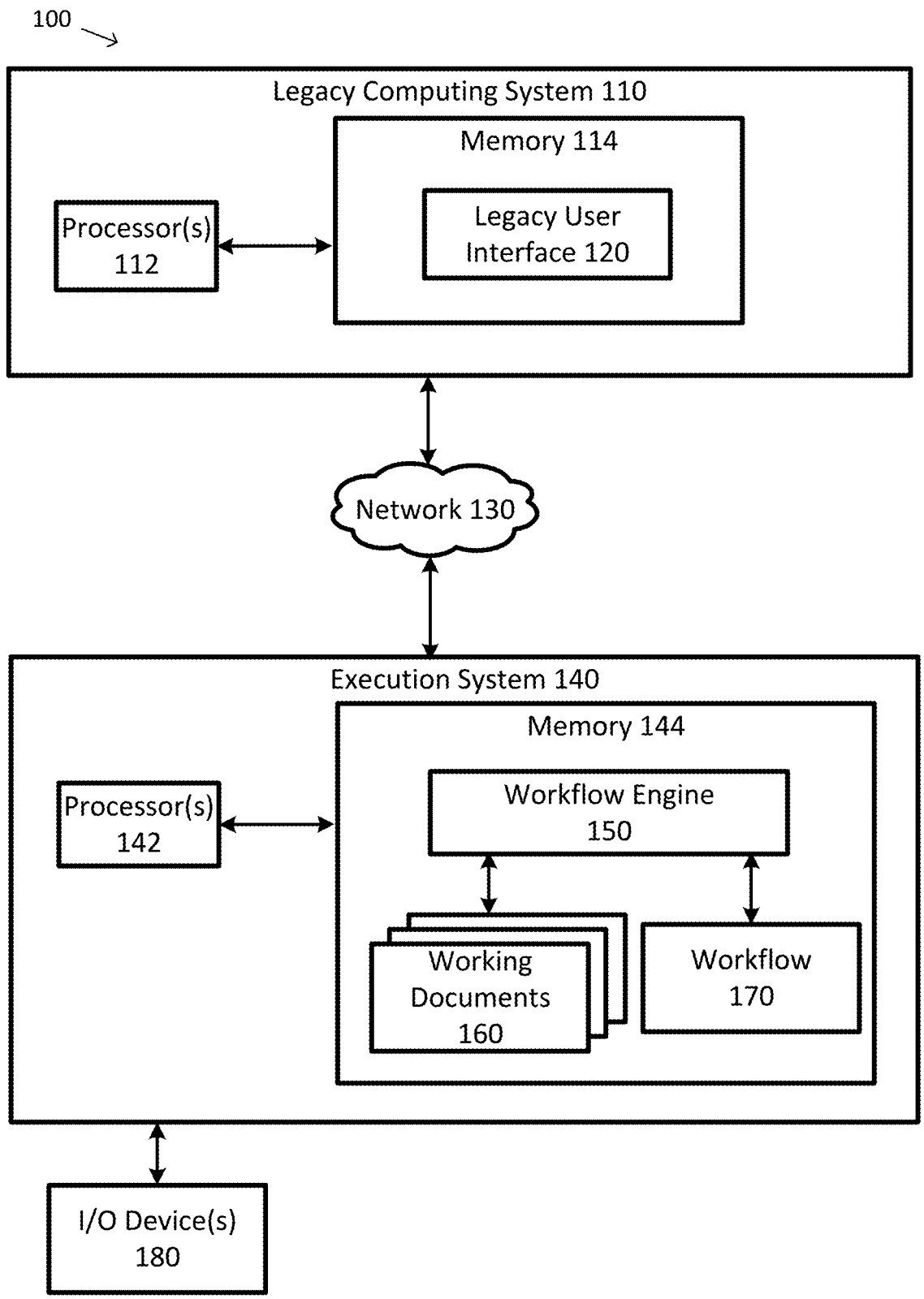
FIG. 1 is a simplified diagram of a computing system usable for legacy user interface augmentation according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Execution systems often act as a bridge between back end servers and the workforce and/or automation systems that are employed to satisfy high-level goals. The back end servers typically have access to large quantities of data that is often stored in large data stores, such as complex databases, and/or the like. This data is typically heavily abstracted into high-level goals that is often far removed from the sub-processes that are to be performed to satisfy the high-level goals. To address this separation, sub-process lists, automation plans, and/or the like are typically prepared and then managed by the back end servers to assign the sub-processes, monitor the sub-processes, and record successful and/or unsuccessful completion of the sub-processes. In some embodiments, the sub-process lists, automation plans, and/or the like may include instructions regarding the performance of manufacturing sub-processes, supervision of inventory management, and/or the like.

According to some embodiments, execution systems often use computing algorithms to combine high-level goals into beneficial work batches, increasing efficiency across the total collection of work requirements. Efficient batches help reduce cost-driving activities such as travel time, repetition, inter-facility congestion, energy consumption, computing and/or networking bandwidth, and/or the like.

Aspects of the this disclosure are described within the context of execution systems for aiding a human workforce in the performance of complex sub-processes, however, it is understood that the aspects of this disclosure may be adapted to work with automated and/or semi-automated systems.

According to some embodiments, once a sub-process list has been selected for performance, the sub-process list is distributed to the human workforce through a legacy user interface. The legacy user interface presents sub-processes of the sub-process list as instructions to the human workforce so as to convey the general job process and specific requirements of the current demands. Once assigned, the human workforce can commence work and feedback progress to the legacy computing system through the legacy user interface.

For many legacy user interfaces used by legacy computing systems, a hardwired and/or networked "dumb" terminal is coupled to the legacy computing system. The legacy user interface then typically consists of a repeating sequence of text messages displayed to an operator followed by prompts to the operator to either supply a response to a query, provide a confirmation, and/or the like. The ability to the legacy user interface to display anything other than text messages is often non-existent or quite limited. Further, the legacy user interface often requires the operator to learn and memorize the types of prompts and the expected form of the response. Further the legacy user interface may often require the operator to memorize previously displayed information and/or to perform complex tasks with little or no further direction from the legacy user interface.

According to some embodiments, the legacy user interfaces may be superficially modernized by adding terminal emulation software (e.g., a Telnet client) to a wearable device, such as a wrist mounted multi-line display and keypad, a heads-up display with voice recognition interface, a barcode scanner, and/or the like. These approaches, however, do little more than modernize the interface mechanism without doing anything to address the other limitations as they are doing little more than substituting the original "dumb" terminal with a modern analog to the "dumb" terminal. And while this does improve the display and input of information, it is not really a meaningful augmentation to the legacy user interface.

As an example, a legacy user interface for a logistics task with modern input/output devices and a custom end-user facing front end that is coded to know which input devices are to be used for which response to the legacy user interface may operate as described below. Upon establishing a connection to the legacy computing system, the legacy computing system through its legacy user interface displays one or more welcome messages, such as may be part of a startup sequence. The one or more welcome messages may then be followed with a prompt for username and password. In response, the operator would key in the login credentials for the legacy computing system.

Once logged in, the legacy user interface may prompt the operator for employee identification information (e.g., a badge number). The operator may then use a scanning device (e.g., a barcode scanner, an RFID scanner, and/or the like) to scan an employee badge and/or the like. The scanning device then provides the employee identification information to the legacy user interface through the terminal emulation. This input is typically predictable and repeatable every time the operator uses the legacy computing system. A menu is then displayed to the operator and the operator is prompted to choose an activity. As an example, the activity may be to fulfill an order for a customer.

Once a particular order is selected, the operator may be asked to provide location information, which may be entered by scanning an area or zone identifier. Depending on the sophistication of the legacy user interface, this may be rejected by the legacy computing system due to business rules, and one or more messages may direct the operator to a different location or to try again.

The legacy user interface then goes into a loop where the operator is prompted to enter a tote identifier, locate and confirm the selection of various items and a corresponding quantity. Throughout this process, the legacy user interface provides various prompts, that direct the operator to the next task. To successfully complete the tasks, the operator has to know all the different prompts, the type of response being requested, and/or the like. The operator may also have to know how to find the indicated locations, locate and identify the requested items, and/or the like. This often involves significant operator training as the legacy user interface is doing little more than direct the operator from task to task that the operator is trained to know how to complete.

Once completed, the legacy user interface may return to the menu or automatically select a next task for the operator.

According to some embodiments, many of the inefficiencies and limitations of these legacy user interfaces may be addressed and the user interface augmented through the use of execution systems having a workflow engine that can receive a workflow definition that facilitates interaction with the legacy user interface so as to better supervise, direct, and/or support the operator in performing the tasks requested by the legacy user interface. However, because a workflow engine and workflow definition approach are used, these improvements may be obtained without having to redevelop or otherwise customize the back end of the legacy computing system and/or develop software for custom end-user facing front ends. Instead, any updates and/or further augmentations may be obtained by changing the workflow definition, which may be done without custom software development as the same workflow engine may be used for many different workflow definitions.

FIG. 1 is a simplified diagram of a computing system 100 usable for legacy user interface augmentation according to some embodiments. As shown in FIG. 1, computing system 100 is built around a client-server model; although other arrangements of the structures are possible as would be understood by one skilled in the art and/or as further described below. Computing system 100 includes a legacy computing system 110. In some examples, legacy computing system 110 may be a back-end server responsible for managing data at an enterprise level and/or the tracking of high-level goals. Legacy computing system 110 includes one or more processors 112 coupled to memory 114. Operation of legacy computing system 110 is controlled by the one or more processors 112. Each of the one or more processors 112 may correspond to a central processing unit, a multi-core processor, a microprocessor, a microcontroller, a digital signal processor (DSP), a graphics processing unit (GPU), a tensor processing unit (TPU), a field programmable gate array (FPGA), an application specific integrated circuit (ASIC), and/or the like. Legacy computing system 110 may be implemented as a stand-alone system, a subsystem and/or a board added to a computing device, and/or as a virtual machine.

Memory 114 may be used to store software executed by legacy computing system 110, one or more data structures, databases, and/or the like used during operation of legacy computing system 110. Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 114 includes a legacy user interface 120. Consistent with the previous description, legacy user interface 120 is typically designed to interact with an operator through a coupled terminal device, such as a "dumb" terminal. In some examples, legacy user interface 120 may be designed to interact with an operator by displaying text messages and receiving text responses. However, in the context of FIG. 1, legacy computing system 110 includes one or more operating system utilities (e.g., a Telnet interface) that allow the input and output streams of legacy user interface 120 to be received and sent over a network 130 to a remote computing device. In some examples, legacy user interface 120 may have back-end interfaces allowing legacy user interface to access files, file systems, databases, and/or the like usable by legacy user interface 120 to perform its designed function.

As further shown in FIG. 1, legacy computing system 110 is coupled to one or more execution systems via network 130. Network 130 may include one or more cables, connectors, buses, network switching devices, routing devices, and/or the like. Network 130 may further include one or more LANs (e.g., an Ethernet), one or more WANs (e.g., the internet), and/or the like. In some examples, network 130 may include one or more wireless devices such as one or more access points, cellular network nodes, and/or the like.

FIG. 1 further shows a representative execution system as an execution system 140, which is coupled to legacy computing system 110 via network 130. Execution system 140 includes one or more processors 142 coupled to memory 144. Operation of execution system 140 is controlled by the one or more processors 142. Each of the one or more processors 142 may correspond to a central processing unit, a multi-core processor, a microprocessor, a microcontroller, a DSP, a GPU, a FPGA, an ASIC, a TPU, and/or the like. Execution system 140 may be implemented as a stand-alone system, a subsystem and/or a board added to a computing device, and/or as a virtual machine.

Memory 144 may be used to store software executed by the execution system 140, one or more data structures, databases, and/or the like used during operation of execution system 140. Memory 144 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 144 includes a workflow engine 150 for receiving, managing, performing, monitoring, reporting on, and/or the like workflows loaded into execution system 140, received from a separate server (not shown), and/or received from legacy computing system 110. Each workflow includes sub-process lists to be performed, data associated with the workflow, and/or the like that is described in further detail below. Example embodiments of execution system 140 and/or workflow engine 150 are described in further detail in U.S. Patent Application Publication No. 2019/0266525, which is incorporated by reference. To support its execution of workflows, workflow engine 150 has access to one or more unstructured and/or semi-structured working documents 160 that include the data used during the performance of the workflows as is described in further detail below.

According to some embodiments, workflow engine 150 may be implemented using fairly lightweight clients that may be stored and executed on smaller and/or low-powered execution systems 140, such as smart phones, tablets, portable computers, and/or the like. In some examples, workflow engine 150 may operate without relying on support from legacy computing system 110 except as needed to pass information back and forth with legacy user interface 120 as a workflow, such as a workflow 170, is being performed. In some examples, workflow 170 is designed to facilitate operator interaction with legacy user interface 120 while augmenting legacy user interface 120 so that the operator is not constrained to interact with legacy user interface 120 exclusively though the exchange of text-based messages and responses.

Execution system 140 is coupled to one or more input/output (I/O) devices 180. The one or more I/O devices 180 support the execution of workflows by providing sensing and/or monitoring capabilities, outputting instructions, providing status updates and other information, and/or the like. In some examples, the one or more I/O devices 180 may include one or more displays, heads up displays, audio output devices (e.g., speakers, headphones, ear buds, etc.), audio input devices (e.g., microphones), imaging devices (e.g., monoscopic cameras, stereoscopic cameras, scanning devices, etc.), input devices (e.g., switches, mice, trackballs, joy sticks, scroll wheels, etc.), sensors (e.g., light, sound, temperature, force, pressure, etc.), actuators (e.g., motors, servos, solenoids, etc.), haptic devices, and/or the like. Each of the one or more I/O devices 180 may be wired to (e.g., via a USB or other cable connection) and/or wirelessly coupled to (e.g., via Bluetooth, Bluetooth Low Energy, RFID, near field communication, etc.) execution system 140 and/or the one or more processors 142. In some examples, workflow engine 150 may have access to one or API functions that provide corresponding interfaces to the one or more I/O devices 180. In some examples, the API functions may be identified by their desired function and/or behavior while remaining device independent with respect to the specific one or more I/O devices 180 coupled to execution system 140. In some examples, one or more drivers may be used to provide device specific interfaces to the one or more I/O devices 180 for the API functions.

Figure 2:
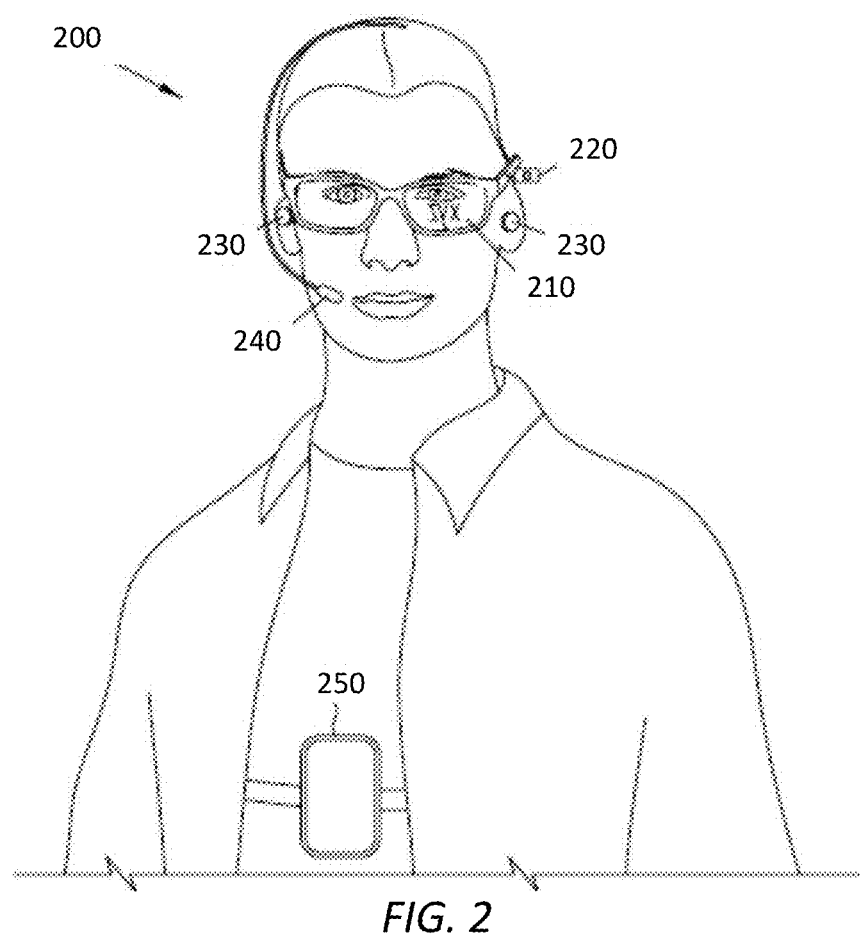
FIG. 2 is a simplified diagram of a wearable computing system according to some embodiments.

FIG. 2 is a simplified diagram of a wearable computing system 200 according to some embodiments. In some embodiments, wearable computing system 200 is consistent with execution system 140 and the one or more I/O devices 180 of FIG. 1. As shown in FIG. 2, an operator is outfitted with wearable computing system 200, which is designed to support the operator in performing a workflow, such as workflow 170, that augments a legacy user interface, such a legacy user interface 120. Wearable computer system 200 further assists the operator in interacting with the legacy user interface while interfering as little as possible with the operator's ability to complete the tasks requested by the legacy user interface.

As further shown in FIG. 2, wearable computer system 200 includes a heads up display 210 including a pair of glasses or goggles on which information to guide the operator and/or provide feedback may be superimposed. Attached to heads up display 210 is an imaging device 220, such as a digital camera, for providing wearable computing system 200 with images as seen by the operator (e.g., wearable computer system 200 sees what the operator sees). In some examples, images captured by imaging device 220 are evaluated to detect specific content and because the images approximately correspond to what the operator sees through heads up display 210, heads up display 210 may be used to superimpose useful information over the images the operator sees. In some examples, imaging device 220 may be monoscopic or stereoscopic. Wearable computer system 200 further includes a set of earpieces 230 that may be used to provide audio feedback to the operator including audible feedback tones (e.g., chimes, beeps, and/or the like), verbal directions, and/or the like. And although earpieces 230 are shown, other configurations are possible including over the ear headphones, and/or the like.

In some examples, wearable computing system 200 may further include a microphone 240 for receiving environmental sounds, verbal directions, and/or the like. In some examples, a signal and/or audio processing sub-system (not expressly shown) may be used to convert the speech of the operator into text-based commands for wearable computing system 200. And although microphone 240 is shown as a boom microphone, other configurations are possible including a lapel microphone, and/or the like.

In some embodiments, wearable computing system 200 may further include additional input devices such as scanners, sensors, and user input devices. In some examples, the other user input devices may include one or more switches, push buttons, tap panels, pressure-sensitive surfaces, and/or the like, such as glove-mounted, belt-mounted, lapel mounted, and/or the like that may be used by the operator to provide confirmation of events and/or activities.

As additionally shown in FIG. 2, wearable computing system includes a computing device 250, which may be consistent with execution system 140. As shown, computing device 250 is waist-mounted, but other configurations are possible including a backpack-based mount, an arm and/or wrist band mount, and/or integration with heads up display 210. Depending upon the embodiment, one or more of heads up display 210, imaging device 220, earpieces 230, and/or microphone 240 may be coupled to computing device 250 using one or more cables and/or wirelessly.

Figure 3:
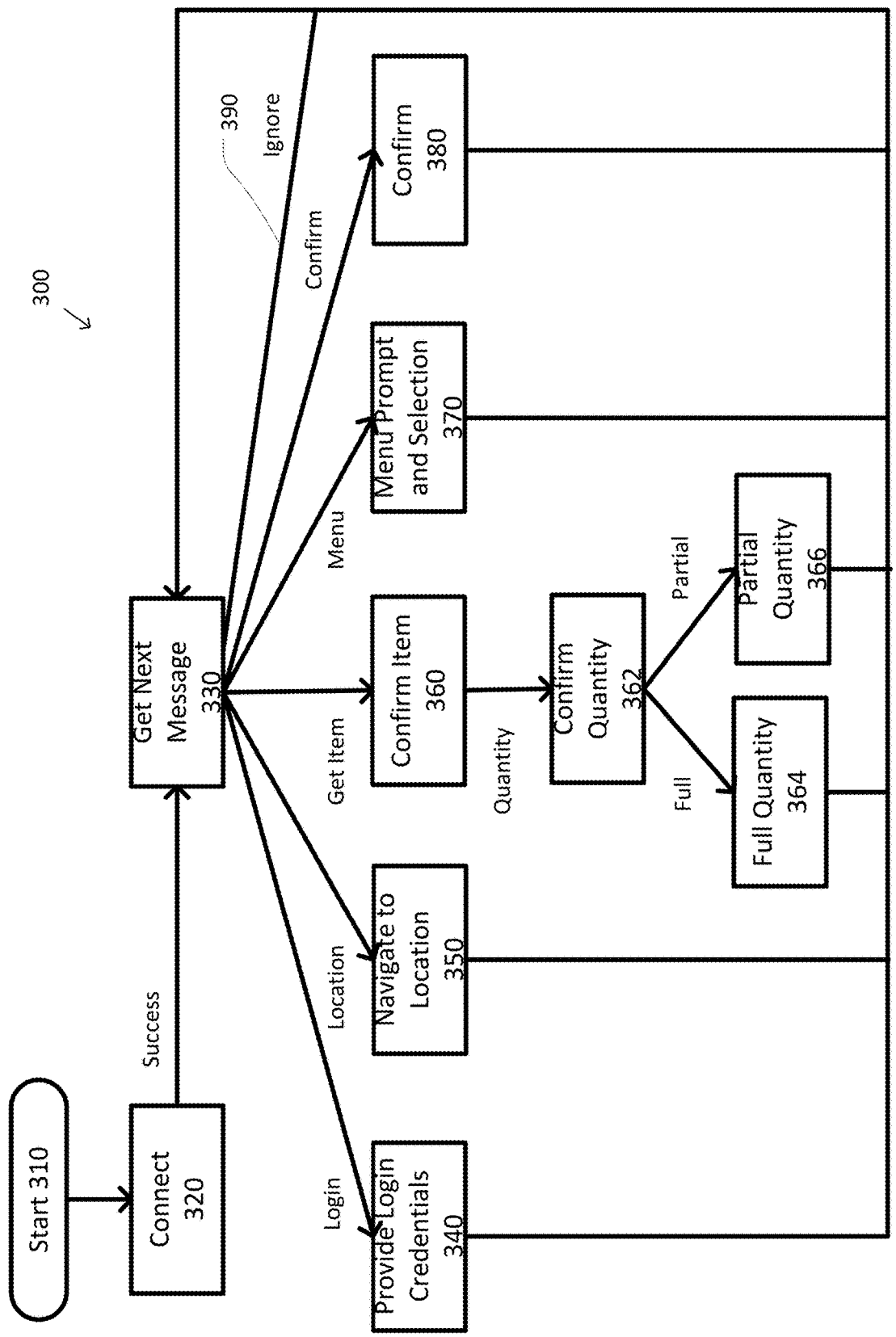
FIG. 3 is a simplified diagram of portions of an example workflow for legacy user interface augmentation according to some embodiments.

FIG. 3 is a simplified diagram of portions of an example workflow 300 for legacy user interface augmentation according to some embodiments. As shown in FIG. 3, the portions of workflow 300 are shown in a state diagram format showing various states or subprocesses in which one or more actions are performed before a transition or routing is made to another state or subprocess. It is understood that the portions of workflow 300 shown in FIG. 3 are representative only and an actual workflow for a legacy user interface, such as legacy user interface 120, may include different and/or additional subprocesses, different and/or additional routings between the subprocesses, different and/or additional actions, and/or the like. In some embodiments, workflow 300 is consistent with workflow 170. In some embodiments, workflow 300 is consistent with the workflows described in further detail in U.S. Patent Application Publication No. 2019/0266525, which is incorporated by reference.

As further shown in FIG. 3, workflow 300 begins with start point 310. Start point 310 identifies the beginning point for workflow 300 so that a workflow engine, such as workflow engine 150 knows where to begin processing and to interact with the legacy user interface. As shown, start point 310 includes an automatic routing or transition to a connect subprocess 320.

The connect subprocess 320 is responsible for establishing a connection from the workflow engine and corresponding execution system (e.g., execution system 140) to the legacy user interface and legacy computing system (e.g., legacy user interface 120 and legacy computing system 110). The connect subprocess 320 includes one or more actions for establishing an appropriate network connection to the legacy computing system and then forming a terminal emulation session with the legacy user interface. In some examples, the connect subprocess 320 may be provided with sufficient information to identify and locate the legacy computing system (e.g., a uniform resource locator (URL), an IP address, and/or the like) and the legacy user interface (e.g., legacy user interface name or identifier, port number, and/or the like). In some examples, the identification and location information for the legacy computing system may be included in a data store, in a working document, (such as one of the one or more working documents 160), and/or the like on the execution system. In some examples, the connection may be a socket connection for which the connect subprocess 320 negotiates and establishes the connection. In some examples, the negotiation may include identifying a type of connection (e.g., raw text, Telnet, VT Telnet, 5250 Telnet, and/or the like) as well as other parameters of the connection. In some examples, the execution system may include one or more connection clients for establishing the connection with a corresponding server component on the legacy computing system. Upon successful connection, the processing of workflow 300 is routed to a get next message subprocess 330.

The get next message subprocess 330 corresponds to a core looping flow within workflow 300 where the workflow engine gets a next message from the legacy user interface over the connection established by the connect subprocess 320 and examines the message to determine the next one or more subprocesses in the workflow to be performed. In order to determine the next one or more subprocesses, the get next message subprocess 330 includes one or more actions that examine the text in the buffer of text received from the legacy user interface and/or waits to receive additional text from the legacy user interface. The get next message subprocess 330 then parses the text in the buffer of received text using string parsing to recognize all or part of the text in the buffer. In some examples, the text in the buffer may include multiple messages that workflow 300 may handle with a single subprocess or with a series of subprocesses that may include repeating the get next message subprocess 330. In some examples, the string parsing may include one or more of matching, matching using one or more wildcards, matching to one or more regular expressions, and/or the like. Once the next one or more subprocesses are identified, the processing of workflow is routed to an appropriate subprocess to handle and provide an appropriate response.

A provide login credentials subprocess 340 is an example of a subprocess that may be configured to automatically respond to a corresponding message received from the legacy user interface. For example, if the message received by the get next message subprocess 330 is a prompt to login, such as to a prompt to enter a username (e.g., as part of a login procedure), the provide login credentials subprocess 340 may automatically respond to the legacy user process with a default username, a username associated with the current operator, solicit a username from the operator, ask the operator to confirm a username to user, and/or the like. This is but one example of the flexibility of the workflow approach as each of these different variations may be addressed by assigning different actions to the provide login credentials subprocess 340 rather than having to write custom software for each. The provide login credentials subprocess 340 may also include other actions including one or more of receiving and recognizing a prompt for a password, soliciting the password from the operator, providing the password in response, receiving and recognizing a prompt for dual authentication (e.g., an RSA ID code, a personal identification number (PIN), and/or the like), providing the dual authentication in response, receiving and recognizing a prompt for a biometric authentication (e.g., a finger print, a voice print, a retinal scan, and/or the like), soliciting the biometric authentication from the operator, providing the biometric authentication in response, and/or the like. Once the provide login credentials subprocess 340 is complete, workflow 300 is routed back to the get next message subprocess 330.

A navigate to location subprocess 350 is an example of a subprocess that provides significant augmentation to the legacy user interface. For example, if the message received by the get next message subprocess 330 is an instruction to go to a specific location, the navigate to location subprocess 350 may do much more than simply provide the location. In some examples, the location may correspond to a GPS location; a latitude and longitude; an address; a landmark; an aisle, bay, level, slot, and/or bin in a warehouse; and/or the like. In some examples, the navigate to location subprocess 350 may include one or more actions for accessing and displaying a map to the operator (e.g., on heads-up display 210) showing a destination location, providing navigation instructions from a current location to the desired location, using real-time location tracking (e.g., tracking via GPS, detecting nearby beacons, detecting nearby indicia using an imaging device such as imaging device 220, and/or the like). In some examples, once the operator has reached the desired location, the navigate to location subprocess 350 may include one or more actions for automatically confirming that the operator has arrived at the location, prompting the operator to confirm that the location has been reached before confirming the arrival, and/or the like. In some examples, the navigate to location subprocess 350 may include one or more actions for soliciting confirmation from the operator by performing one or more of displaying a head-up prompt, emitting a tone, emitting a verbal request, and/or the like. In some examples, the navigate to location subprocess 350 may include one or more actions for receiving the confirmation from the operator by one or more of detecting a button press, receiving verbal confirmation using microphone 240, and/or the like. Once the navigate to location subprocess 350 is complete, workflow 300 is routed back to the get next message subprocess 330.

A confirm item subprocess 360 is an example of a subprocess that uses context-sensitive and response-driven variations in workflow 300. For example, if the message received by the get next message subprocess 330 is an instruction to pick a specified quantity of a specific item, the confirm item subprocess 360 may do much more than simply provide an identifier for the specific item and the specific quantity. In some examples, the confirm item subprocess 360 may aid the user in finding the specific item by including one or more actions for accessing a database and displaying an image of the specific item, providing heads-up visual cues that help recognize the specific item or indicia associated with the specific item (e.g., a bar code or QR code on a bin containing the item, providing visual cues or audible instructions to look up, down, left, and/or right, and/or the like. Once the specific item is confirmed by an action of the confirm item subprocess 360 (e.g., by providing a suitable response to the legacy user interface), a confirm quantity message is received, which routes workflow 300 to a confirm quantity subprocess 362. The confirm quantity subprocess 362 may include one or more actions to ask the operator to confirm as each instance of the specific item is selected (e.g., by detecting a button process, receiving verbal confirmation of each item such as by counting detected using microphone 240, and/or the like), receiving confirmation that the specific quantity is selected, receiving specific confirmation of how many of the specific item are selected, and/or the like. When the full amount of the specific quantity is confirmed, workflow 300 is routed to a full quantity subprocess 364, which provides confirmation to the legacy user interface that the specific quantity of the specific item has been selected. When less than all of the specific quantity are available (e.g., a partial amount), workflow 300 is routed to a partial quantity subprocess 366, which may include one or more actions for reporting to the legacy user interface that the specific quantity has not been selected, how many of the specific item were actually selected, and/or the like. In some examples, the partial quantity subprocess 366 may include one or more actions to record the specific item and the number of units short to a working document to be handled later by workflow 300 using a subprocess not shown. Once either the full quantity subprocess 364 or the partial quantity subprocess 366 are complete, workflow 300 is routed back to the get next message subprocess 330.

Workflow 300 may also include one or more subprocesses to handle operator selection from menus, such as when the order of workflow 300 may be more independently controlled by the operator. For example, if the message received by the get next message subprocess 330 is a menu, workflow 300 may be routed to a menu prompt and selection subprocess 370. The menu prompt and selection subprocess 370 may include one or more actions for presenting some or all of the menu options to the operator (e.g., via heads-up display such as by using heads-up display 210, audio prompting such as by using earpieces 230, and/or the like), receiving a menu item selection from the operator, providing the selection as a response to the legacy user interface, and/or the like. Once the menu prompt and selection subprocess 370 is complete, workflow 300 is routed back to the get next message subprocess 330.

Workflow 300 may also include one or more subprocesses to handle confirmations from the operator. For example, when the message received by the get next message subprocess 330 is a request for operator confirmation (e.g., "Press RETURN to continue.", and/or the like), workflow 300 may be routed to a confirm subprocess 380. In some examples, the confirm subprocess 380 may include one or more actions for soliciting confirmation from the operator by performing one or more of displaying a head-up prompt, emitting a tone, emitting a verbal request, and/or the like. In some examples, the confirm subprocess 380 may include one or more actions for receiving the confirmation from the operator by one or more of detecting a button press, receiving verbal confirmation using microphone 240, and/or the like. In some examples, the confirm subprocess 380 may be used when any of multiple different messages from different portions of the legacy user interface are received. In some examples, the confirm subprocess 380 may include one or more actions to provide a context-sensitive confirmation response to the legacy user interface (e.g., a return, a space, any key, and/or the like) based on the type of confirmation response the legacy user interface is expecting. Once the confirm subprocess 380 is complete, workflow 300 is routed back to the get next message subprocess 330.

Workflow 300 may also be configured to ignore certain messages, such as indicated by a routing 390 from the get next message subprocess 330 back to the get next message subprocess 330 after receiving the message.

As discussed above and further emphasized here, FIG. 3 is merely an example which should not unduly limit the scope of the claims. One of ordinary skill in the art would recognize many variations, alternatives, and modifications. In some embodiments, different subprocesses and/or actions may be used to augment the legacy user interface with other types of functionality. In some embodiments, the routing from the get next message subprocess 330 may further be determined based on information previously stored in a working document so that the handling of a same message may be appropriately context dependent. In some examples, the same message may be received at different places in the legacy user interface and the stored information may be used to implement a routing that is dependent on that context information.

In some embodiments, one or more subprocess or actions may scrape and/or extract information from one or more of the messages received from the legacy user interface and/or one or more of the responses sent to the legacy user interface. The extracted information may then be stored in a working document. The stored information may be retrieved at a later point in time for presentation to the operator and/or to provide as part or all of a response to the legacy user interface. In some examples, this relieves the burden from the operator of having to remember this information, having to recall it later, having to re-determine the information, having to track down the information, and/or the like. As an example of information that may be extracted, the legacy user interface may provide a hazardous material warning, such as when asking the operator to navigate to a location or to interact with some item or device. In some examples, workflow 300 may display this to the user on the heads-up display with a persistent caution or warning indicator even though the legacy user interface may not continue to send or display the warning again to the operator. As another example, of information that may be extracted, the legacy user interface may divide an activity into sub-tasks while only providing an indication of the change between sub-tasks at the start of the sub-task (e.g., to place the next indicated items in a region of an order picking tote). In some examples, workflow 300 may extract the sub-task information, store it, and then provide a reminder to the operator during subsequent subprocesses even though the legacy user interface does not further send the sub-task indication. When workflow 300 detects the change in sub-task, workflow 300 may extract, store, and provide reminders associated with the new sub-task information.

In some embodiments, workflow 300 may be configured so that different messages and/or prompts that lead to the same request to the operator, workflow 300 may be configured to handle them with a same subprocess. In some examples, this reduces the need for the operator to memorize and understand all the variant ways in which the legacy user interface makes effectively the same request. In some examples, this also normalizes the operator experience into a uniform and succinct set of requests to the operator. In some examples, this strategy may additionally be used substitute archaic terminology with modern terminology.

In some embodiments, workflow 300 may not provide all of the text received from the legacy user interface to the operator. In some examples, workflow 300 may expressly omit displaying personal and/or other private information received from the legacy user interface. In some examples, the legacy user interface may have been developed before changes to privacy law and/or practice were implemented (e.g., related to Health Insurance Portability and Accountability Act (HIPAA) compliance, Federal Educational Rights and Privacy (FERPA) compliance, General Data Protection Regulation (GDPR) compliance, and/or the like) so that the augmentations provided by workflow 300 may be compliant with changes in compliance practice. In some examples, workflow 300 may expand, translate, compress, and/or otherwise alter the text received from the legacy user interface before presenting information to the operator.

In some embodiments, workflow 300 allows custom validations to be implemented for information received from the operator. In some examples, the validations may include one or more of minimal character lengths, response formats, specific types of inputs, and/or the like. In some examples, the validations remove the burden of validations from the legacy user interface, avoid the handling of re-prompting requests by workflow 300, avoid areas of the legacy user interface that are known not to handle erroneous input well, and/or the like.

In some embodiments, workflow 300 is not constrained to the rigidness of the legacy user interface. In some examples, workflow 300 and its use of the working document may allow workflow 300 to provide information to the legacy user interface out of the normal execution order expected by the legacy user interface. In some examples, because workflow 300 is not constrained to the limits of the legacy user interface it may identify and determine information in ways not supported by a legacy user interface coupled to a "dumb" terminal. In some examples, workflow 300 may open multiple instances of the legacy user interface and/or instances of different legacy user interfaces to solicit information from one of the legacy user interfaces to help respond to a request in another of the legacy user interfaces. In some examples, an information request by one of the legacy user interfaces may be determined by using another of the legacy user interfaces (or some other user interface, such as the internet, a database, and/or the like) to look up the information, thus relieving the operator of the burden of having the memorize the requested information. In some examples, workflow 300 may interleave activity between multiple legacy user interfaces, such as where it may be advantageous to have the operator handle two tasks in parallel.

In some embodiments, workflow 300 may include routings for exiting workflow early such as due to the detection of exceptions, operator request, and/or the like. In some examples, workflow 300 may include one or more subprocesses or one or more actions that are able to safely exit from the legacy user interface while relieving the operator of the burden of having to know when and how to close out the legacy user interface in the middle of a task.

In some embodiments, one or more of the subprocess of workflow 300 may include one or more logging actions. In some examples, the one or more logging actions may store information to one or more working documents that persist between instances of performing workflow 300. In some examples, the one or more logging actions may record operator responses to various prompts from the legacy user interface. In some examples, the logged responses may be examined by the workflow engine to determine whether the operator has a pattern of always providing a same response to a same message and then deciding whether to perform one or more updates to workflow 300. In some examples, the one or more updates may include one or more of converting that same response to a default response to always be entered, prompting the operator to determine whether the same response should be turned into a default response and/or added to a list of suggested responses to be provided to the operator when the same message is again received, and/or the like. In some examples, the logged responses may be used by a developer to improve workflow 300.

Figure 4:
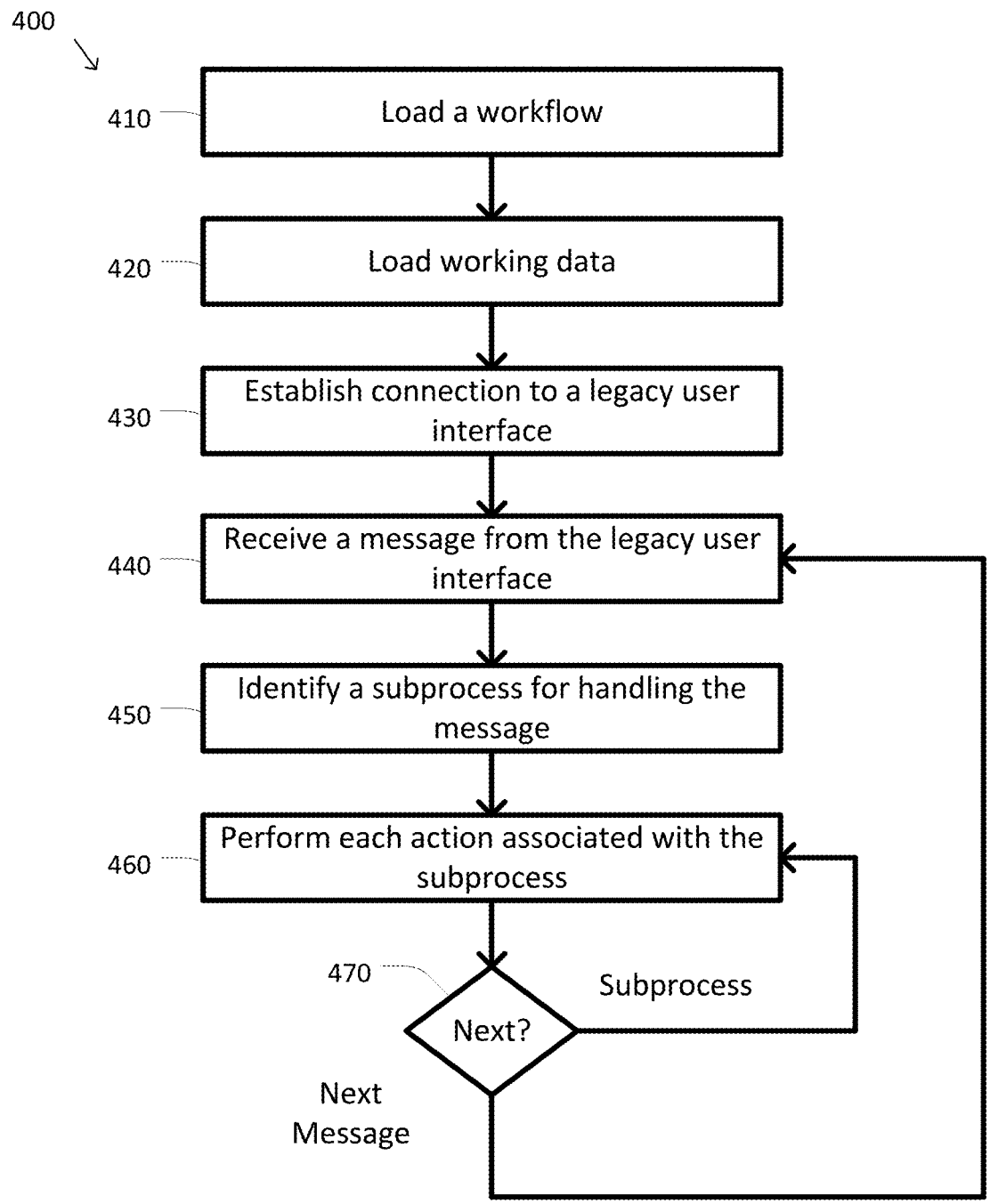
FIG. 4 is a simplified diagram of a method of workflow processing for augmenting a legacy user interface according to some embodiments.

FIG. 4 is a simplified diagram of a method of workflow processing for augmenting a legacy user interface according to some embodiments. One or more of the processes 410-470 of method 400 may be implemented, at least in part, in the form of executable code stored on non-transitory, tangible, machine readable media that when run by one or more processors may cause the one or more processors to perform one or more of the processes 410-470. In some examples, method 400 may be implemented by a workflow engine, such as workflow engine 150. In some examples, method 400 may be consistent with the performance of a workflow, such as workflow 300, for augmenting a legacy user interface. In some embodiments, process 420 is optional and may be omitted. In some embodiments, method 400 may include other processes that are not expressly shown, such as any processes described with respect to workflow 300 and/or the additional embodiments described with respect to FIG. 3.

At a process 410, a workflow is loaded. In some examples, the workflow may be loaded from memory and/or storage of a workflow engine, such as workflow engine 150. In some examples, the workflow a may be received from a workflow module executing on a back end server. In some examples, the workflow may be received over a network, loaded from a portable data module (e.g., a portable flash drive), and/or the like. In some examples, the workflow may be received from a workflow store. The workflow describes the sub-processes that are performed as part of the workflow, the order of the sub-processes, and/or the like. In some examples, the workflow is described via a semi-structured document that uses a workflow grammar. In some examples, the workflow may be consistent with workflow 300 and/or the workflows described in U.S. Patent Application Publication No. 2019/0266525, which is incorporated by reference.

At an optional process 420, working data is loaded. In some examples, the working data may be loaded from memory and/or storage of a workflow engine, such as workflow engine 150. In some examples, the working data may be loaded from one or more working documents, such as the one or more working documents 160. In some examples, the working data may be received from a workflow module executing on a backend server, from a legacy computing system (such as legacy computing system 110), and/or the like. In some examples, the working data may be received over a network, loaded from a portable data module (e.g., a portable flash drive), and/or the like.

At a process 430, a connection to a legacy user interface is established. In some examples, the connection may be established in a fashion consistent with that described with respect to the connect subprocess 320.

At a process 440, a message from the legacy user interface is received. In some examples, the receiving of the message may be consistent with the approach described with respect to the get next message subprocess 330.

At a process 450, a subprocess for handling the message is identified. In some examples, the message received during process 440 is parsed to determine whether it includes one or more textual patterns that identify the message and how the operator and/or the workflow should respond to the legacy user interface. In some examples, the message may be parsed consistent with the approach described with respect to the get next message subprocess 330. In some examples, once the type of the message is determined and the how it should be responded to is determined, a subprocess for handling the message is identified based on the routings in the workflow.

At a process 460, each action associated with the subprocess is performed. In some examples, the actions to perform are described in the workflow, such as is described in the workflows of U.S. Patent Application Publication No. 2019/0266525, which is incorporated by reference. Examples of various actions associated with the subprocess are described with respect to subprocesses 340-380 of workflow 300.

At a process 470, the next routing for the workflow is determined. When processing for the message received during process 440 is complete, method 400 returns to process 440 to wait until a next message is received from the legacy user interface. In some examples, the next routing which returns to process 440 is described in the workflow as a next routing for the subprocess identified during process 450. When processing for the message received during process 440 involves the performance of an additional subprocesses, each of the actions for the additional subprocess are performed using process 460. In some examples, the additional subprocess to be performed is determined according to the routings in the workflow. Examples of subprocesses being routed to an additional subprocess are subprocesses 360 and 362 of workflow 300.

Figure 5:
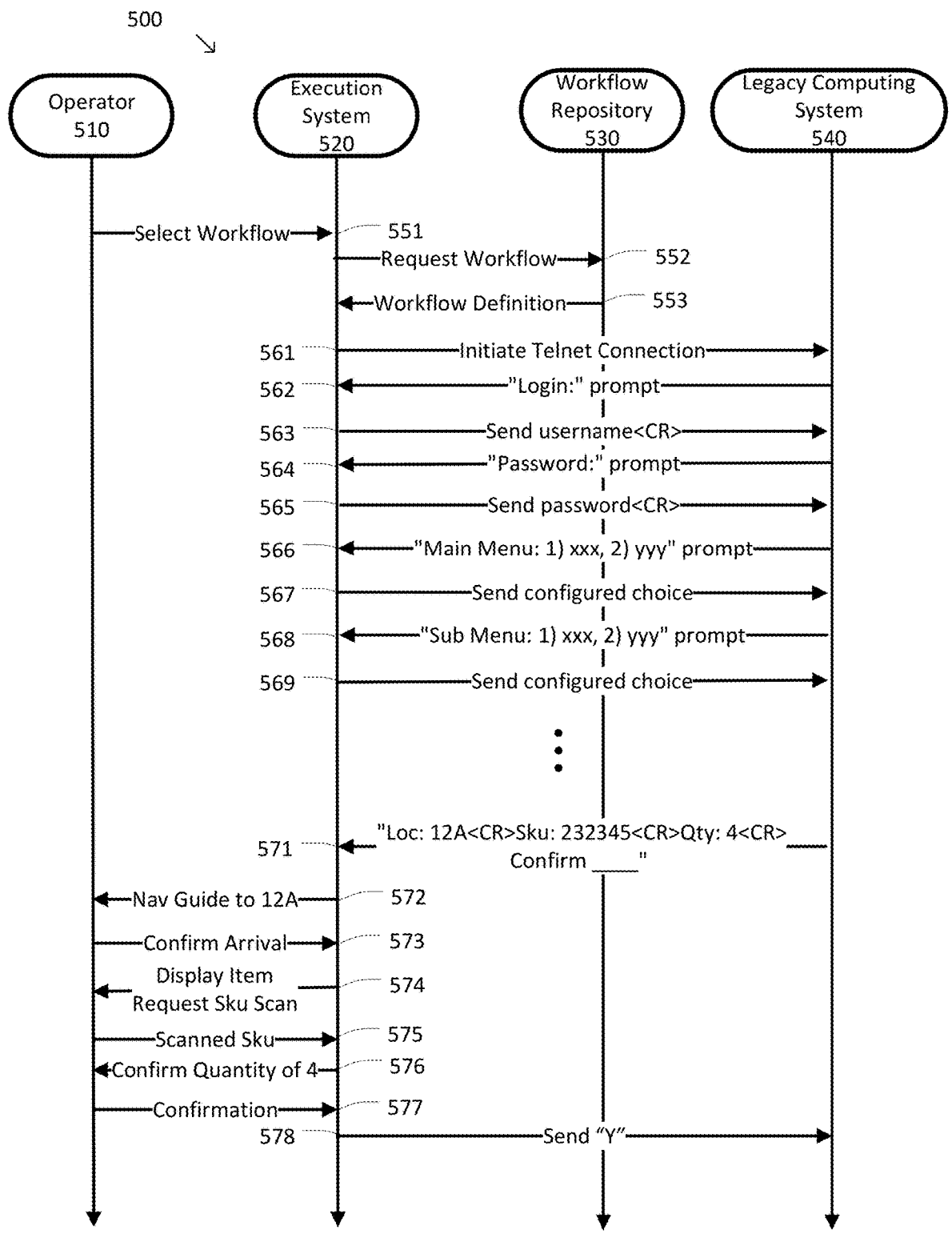
FIG. 5 is a simplified diagram of an example interaction between a legacy computing system and an execution system according to some embodiments.

FIG. 5 is a simplified diagram 500 of an example interaction between a legacy computing system and an execution system according to some embodiments. In some examples, the interactions of diagram 500 are consistent with the operation of workflow 300 and/or method 400. FIG. 5 shows the interactions between an operator 510, an execution system 520, a workflow repository 530, and a legacy computing system 540 as might occur during the performance of a logistics task using a workflow approach consistent with the other embodiments described herein. In some examples, execution system 520 is consistent with execution system 140 and/or legacy computing system 540 is consistent with legacy computing system 110.

As shown at an interaction 551, operator 510 instructs execution system 520 to select an indicated workflow. Execution system 520 then requests a copy of the workflow from workflow repository 530 as shown in an interaction 552. In response, workflow repository 530 returns the workflow to execution system 520 as shown in an interaction 553. In some examples, some or all of interactions 551-553 may occur as part of process 410.

After the workflow is loaded by execution system 520, execution of the workflow begins. As shown at an interaction 561, workflow execution system initiates a Telnet connection with legacy computing system 540. In some examples, interaction 561 may occur as part of the connect subprocess 320 and/or process 430.

Once execution system 520 is connected with legacy computing system 540, a legacy user interface, such as legacy user interface 120, of legacy computing system 540 and execution system 520 may begin exchanging text messages over the Telnet connection established during interaction 561. At an interaction 562, legacy computing system 540 sends a login prompt by sending the text "Login:". Execution system 520 responds by sending text corresponding to the username for the operator and/or the workflow followed by a carriage return (<CR>) as shown at an interaction 563. After the legacy user interface of legacy computing system 540 receives the username, the legacy user interface responds with a password prompt using the text "Password:" as shown at an interaction 564. Execution system 520 responds by sending text corresponding to the password followed by a carriage return as shown at an interaction 565. In some examples, the username and/or the password may be loaded from a working document and/or the workflow. In some examples, interactions 562-565 may occur as part of the provide login credentials subprocess 340.

Execution system 520 then continues additional interaction with the legacy user interface of legacy computing system 540 via several exchanges shown by interactions 556-569 that show execution system 520 and the workflow automatically traversing a menu structure of the legacy user interface. In some examples, interactions 562-569 show the ability of the workflow and execution system 520 to automatically receive and respond to text messages from the legacy user interface of legacy computing system 540 on behalf of operator 510 and the workflow without having to present any of the text to operator 510 and/or solicit input from operator 540.

After additional interactions (not shown), the legacy user interface of legacy computing system 540 sends a text request to execution system 520 to have operator 510 locate and select a desired quantity of an item as shown by the text "Loc: 12A<CR>Sku: 23245<CR>Qty:4<CR>Confirm_" sent over the Telnet connection as shown at an interaction 571. As this text demonstrates, the legacy user interface may, at times, be rather terse and rely on specific knowledge of operator 510 to complete the requested task and provide the requested confirmation. For example, in order for operator 510 to complete this task, operator 510 needs to know where location 12A is, how to get there, how to recognize the item identified by Sku 232345, and/or the like among other things. Execution system 520 and the workflow are able to augment the legacy user interface to better aid operator 510 in performing the task. In some examples, the text actually asks operator 510 to perform a series of four sub-tasks: go to location 12A, find the item with Sku 232345, select 4 of the items, and confirm the selection. In some examples, even though this text is sent all at once by the legacy user interface, it is captured in a text buffer where the text is parsed and information is extracted by execution system 520 according to the workflow. In some examples, the text may be parsed and the information extracted during multiple passes through the get next message subprocess 330.

As shown at an interaction 572, execution system 520 uses its knowledge of location 12A to provide operator 510 with one or more of a map from a current location to location 12A, directions from a current location to location 12A, real-time tracking while operator 510 moves to location 12A, and/or the like. At an interaction 573, arrival at location 12A is confirmed by operator 510 by, for example, performing a confirmation action, scanning a location 12A barcode, moving within proximity of a beacon at or near location 12A, and/or the like. In some examples, interactions 572 and/or 573 may occur as part of the navigate to location subprocess 350.

Once at the location, execution system 520, under the direction of the workflow, displays an image of an item corresponding to Sku and requests that operator 510 scan the Sku to confirm that the item has been found. In response, operator 510 provides a scan of the Sku (e.g., by scanning a barcode on a bin containing the item and/or on an item having the barcode) as shown at an interaction 575. In some examples, interactions 574 and 575 may occur without execution system 520 having to display the Sku 232345 to operator 510. Once execution system 520 and the workflow have confirmed that operator 510 has located the correct items based on the scanned Sku, execution system 520 and the workflow prompt operator 510 to confirm that a quantity of 4 items has been selected as shown at an interaction 576. At an interaction 577, operator 510 provides confirmation that four of the item with Sku 232345 have been selected. Once the quantity has been confirmed by execution system 520 and the workflow, execution system 520 returns the text string "Y" to the legacy user interface of legacy computing system 540. In some examples, interactions 574-578 may occur as part of subprocesses 360-366.

In some examples, interactions 571-578 demonstrate the ability of execution system 520, under the direction of the workflow, to receive compound text instructions from the legacy user interface, convert the compound instructions into a sequence of separate sub-tasks, augment the text instructions by adding additional information (e.g., navigation information, images of the item, and/or the like), and/or the like without having to display all of the received text to operator 510 and/or receive all of the response text from operator 510.

In some embodiments, the use of a workflow to augment a legacy user interface allows workflows for legacy user interfaces to be modified and/or created without having to rewrite or write a custom heavy-weight client with each change in the workflow. As long as the developer knows the desired order of the subprocess flow and how each of the actions are to handle the messages and requests from the legacy user interface, workflows can be quickly created that can be performed using a client device (e.g., execution system 140 and/or computing device 250)

Some embodiments of the execution systems described herein may include non-transient, tangible, machine-readable media that include executable code and machine-readable instructions that when run by one or more processors (e.g., the one or more processors 142 in execution system 140 and/or the one or more processors in computing device 250) may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A portable computing device comprising:
   a memory;
   one or more input/output devices; and
   one or more processors coupled to the memory and the one or more input/output devices;
   wherein the one or more processors execute a workflow engine configured to:
      load a workflow document specifying a workflow described according to a workflow structure, the workflow structure describing subprocesses of the workflow, routings between the subprocesses, and actions that make up the subprocesses, wherein the workflow document is a semi-structured document written according to a workflow grammar;
      identify, based on the workflow, a legacy user interface executing on a legacy computer system and a type of the legacy user interface, the legacy user interface being a text-based interface;
      establish, based on the workflow and the type of the legacy user interface, a Telnet connection between the workflow engine executing on the portable computing device and the legacy user interface on the legacy computer system;
      after establishing the Telnet connection, receive a text-based message from the legacy user interface and the legacy computer system;
      in response to receiving the text-based message, determine a subprocess for responding to the text-based message based on the workflow; and
      perform one or more actions of the determined subprocess, wherein the one or more actions comprise sending, to the legacy user interface and the legacy computer system, a text-based response to the legacy user interface and the legacy computer system;
      wherein to perform the one or more actions, the one or more processors are configured to:
      present information from the text-based message to an operator;
      solicit input from the operator;
      send the text-based response to the legacy user interface based on the input and
      validate the input received from the operator using one or more custom validations of the workflow before sending the text-based response to the legacy user interface and the legacy computing system.

2. The portable computing device of claim 1, wherein the one or more processors are configured to repeat the receiving, determining, and performing for additional text-based messages from the legacy user interface.

3. The portable computing device of claim 1, wherein to perform the one or more actions, the one or more processors are configured to send a default response to the text-based message to the legacy user interface.

4. The portable computing device of claim 1, wherein the one or more processors are further configured to ignore a second text-based message received from the legacy user interface and the legacy computer system.

5. The portable computing device of claim 1, wherein to perform the one or more actions, the one or more processors are configured to store information extracted from the text-based message or the text-based response in a working document.

6. The portable computing device of claim 1, wherein to perform the one or more actions, the one or more processors are configured to retrieve information stored in a working document.

7. The portable computing device of claim 1, wherein to perform the one or more actions, the one or more processors are configured to:
   connect to a second legacy user interface; and
   receive or send information to the second legacy user interface.

8. The portable computing device of claim 7, wherein the second legacy user interface is a second instance of the legacy user interface.

9. The portable computing device of claim 1, wherein to perform the one or more actions, the one or more processors are configured to:
   obtain additional information to augment information received in the text-based message;
   and present the additional information to the operator.

10. The portable computing device of claim 9, wherein the additional information includes one or more of an image of an item, a map to a destination, or directions to the destination.

11. The portable computing device of claim 1, wherein to perform the one more actions, the one or more processors are further configured to:
    receive a warning from the legacy user interface;
    display the warning to the operator; and
    continue to display the warning to the operator even though the warning is no longer being received from the legacy user interface.

12. The portable computing device of claim 1, wherein to perform the one more actions, the one or more processors are further configured to:
    log information received from the operator in the working document;
    examine the logged information for a pattern; and
    update the workflow, based on the pattern, to add a response to a list of suggested responses provided to the operator as part of the workflow.

13. A method comprising:
    loading, by one or more processors of a portable computing device executing a workflow engine, a workflow document specifying a workflow described according to a workflow structure, the workflow structure describing subprocesses of the workflow, routings between the subprocesses, and actions that make up the subprocesses, wherein the workflow document is a semi-structured document written according to a workflow grammar;
    identifying, by the one or more processors based on the workflow, a legacy user interface executing on a legacy computer system and a type of the legacy user interface, the legacy user interface being a text-based interface;

establishing, by the one or more processors and based on the workflow and the type of the legacy user interface, a Telnet connection between the workflow engine on the portable computing device and the legacy user interface on the legacy computer system, the legacy user interface executing on the legacy computer system;

after establishing the Telnet connection, receiving, by the one or more processors, a text-based message from the legacy user interface and the legacy computer system;

in response to receiving the text-based message, determining, by the one or more processors, a subprocess for responding to the text-based message based on the workflow; and performing, by the one or more processors, one or more actions of the determined subprocess, wherein the one or more actions comprise sending, to the legacy user interface and the legacy computer system, a text-based response to the text-based message to the legacy user interface and the legacy computer system;

wherein performing the one or more actions comprises:
presenting information from the text-based message to an operator;
soliciting input from the operator;
sending the text-based response to the legacy user interface based on the input
and
validating the input received from the operator using one or more custom validations of the workflow before sending the text-based response to the legacy user interface and the legacy computing system.

14. The method of claim 13, wherein performing the one or more actions further comprises one or more of:
sending a default response to the text-based message to the legacy user interface;
storing information extracted from the text-based message or the text-based response in a working document;
retrieving information stored in the working document;
connecting to a second legacy user interface;
receiving information from the second legacy user interface; or
sending information to the second legacy user interface.

15. The method of claim 13, wherein performing the one or more actions comprises:
obtaining additional information to augment information received in the text-based message; and
presenting the additional information to the operator;
wherein the additional information includes one or more of an image of an item, a map to a destination, or directions to the destination.

16. The method of claim 13, wherein performing the one more actions further comprises:
receiving a warning from the legacy user interface;
displaying the warning to the operator; and
continuing to display the warning to the operator even though the warning is no longer being received from the legacy user interface.

17. The method of claim 13, wherein performing the one more actions further comprises:
logging information received from the operator in the working document;
examining the logged information for a pattern; and
updating the workflow, based on the pattern, to add a response to a list of suggested responses provided to the operator as part of the workflow.

18. A non-transitory machine-readable medium comprising a plurality of machine-readable instructions which when executed by one or more processors associated with a portable computing device cause the processors to execute a workflow engine to perform a method comprising:
loading a workflow document specifying a workflow described according to a workflow structure, the workflow structure describing subprocesses of the workflow, routings between the subprocesses, and actions that make up the subprocesses, wherein the workflow document is a semi-structured document written according to a workflow grammar;
identifying, based on the workflow, a legacy user interface executing on a legacy computer system and a type of the legacy user interface, the legacy user interface being a text-based interface;
establishing, based on the workflow and the type of the type of the legacy user interface, a Telnet connection between the workflow engine on the portable computing device and the legacy user interface on the legacy computer system, the legacy user interface executing on the legacy computer system;
after establishing the Telnet connection, receiving a text-based message from the legacy user interface and the legacy computer system;
in response to receiving the text-based message, determining a subprocess for responding to the text-based message based on the workflow; and
performing one or more actions of the determined subprocess, wherein the one or more actions comprise sending, to the legacy user interface and the legacy computer system, a text-based response to the text-based message to the legacy user interface and the legacy computer system;
wherein performing the one or more actions comprises:
presenting information from the text-based message to an operator;
soliciting input from the operator;
sending the text-based response to the legacy user interface based on the input
and
validating the input received from the operator using one or more custom validations of the workflow before sending the text-based response to the legacy user interface and the legacy computing system.

19. The non-transitory machine-readable medium of claim 18, wherein performing the one more actions further comprises:
receiving a warning from the legacy user interface;
displaying the warning to the operator; and
continuing to display the warning to the operator even though the warning is no longer being received from the legacy user interface.

20. The non-transitory machine-readable medium of claim 18, wherein performing the one more actions further comprises:
logging information received from the operator in the working document;
examining the logged information for a pattern; and
updating the workflow, based on the pattern, to add a response to a list of suggested responses provided to the operator as part of the workflow.

* * * * *